(12) United States Patent
Kasower

(10) Patent No.: US 8,660,919 B2
(45) Date of Patent: Feb. 25, 2014

(54) METHOD FOR MONITORING AND REPORTING CHANGES IN THE VALUE OF REAL ESTATE

(75) Inventor: Sheldon Kasower, Canoga Park, CA (US)

(73) Assignee: Consumerinfo.com, Inc., Costa Mesa, CA (US)

( * ) Notice: Subject to any disclaimer, the term of this patent is extended or adjusted under 35 U.S.C. 154(b) by 1707 days.

(21) Appl. No.: 11/173,440

(22) Filed: Jul. 1, 2005

(65) Prior Publication Data
US 2007/0005383 A1    Jan. 4, 2007

(51) Int. Cl.
*G06Q 40/00* (2012.01)

(52) U.S. Cl.
USPC ............... 705/35; 705/306; 705/313; 705/1.1

(58) Field of Classification Search
USPC .......................................... 705/35–45; 707/3
See application file for complete search history.

(56) References Cited

U.S. PATENT DOCUMENTS

| | | | | |
|---|---|---|---|---|
| 5,361,201 A * | 11/1994 | Jost et al. | .......................... | 705/35 |
| 5,857,174 A * | 1/1999 | Dugan | ........................... | 705/313 |
| 6,115,694 A * | 9/2000 | Cheetham et al. | ........... | 705/7.35 |
| 2002/0035520 A1* | 3/2002 | Weiss | .............................. | 705/27 |
| 2002/0049624 A1* | 4/2002 | Raveis, Jr. | ......................... | 705/8 |
| 2003/0078897 A1* | 4/2003 | Florance et al. | ................ | 705/80 |
| 2004/0133493 A1* | 7/2004 | Ford et al. | ....................... | 705/35 |
| 2004/0243450 A1* | 12/2004 | Bernard et al. | ................... | 705/4 |

* cited by examiner

*Primary Examiner* — Kambiz Abdi
*Assistant Examiner* — Abhishek Vyas
(74) *Attorney, Agent, or Firm* — Knobbe Martens Olson & Bear LLP

(57) ABSTRACT

This invention discloses a process involving automatic notification to interested individuals of current real estate values. The process consists of a monitoring service entity, external data source, and end-user. The disclosed embodiments include a process whereby parties can be directly notified of real estate values or alternatively may initiate contact with the monitoring entity to receive data.

20 Claims, 5 Drawing Sheets

*FIG. 4*

House America ℠

☐ Washington Mutual
1727 W Avenue K #101
Lancaster, CA 93504
1-800-222-1234

Hi John and Jill.

This 'real time' notice of a recent sale of a home in your neighborhood is a new service only available from First American Corporation, as a part of your home warranty service.

Since sales of properties in your area can directly affect the equity in your home, knowing about new sales as they occur allows you to maximize that equity.

Please think of this "notice" as a sort of "house statement" reflecting your home's current value...similar to those statements you receive from your bank.

Please don't hesitate to give me a call at 1-800-222-1234 or on my cell phone at 1-319-456-7869 if you'd like to chat.

Please enter the address for the property you would like to monitor

Address:
Apt#:
City:
State:
Zip code:

SUBMIT

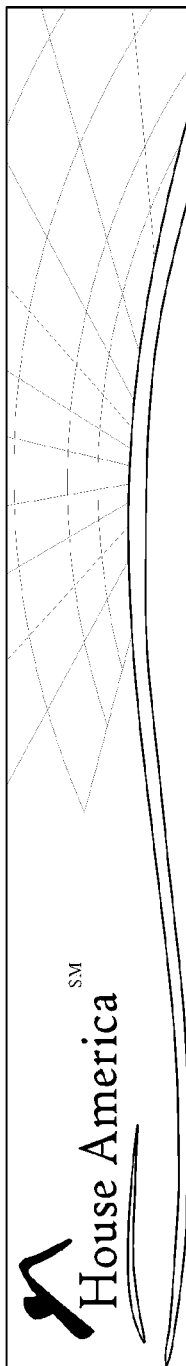

FIG. 5

House America℠

☐ Washington Mutual
1727 W Avenue K #101
Lancaster, CA 93504
1-800-222-1234

Hi John and Jill.

This 'real time' notice of a recent sale of a home in your neighborhood is a new service only available from First American Corporation, as a part of your home warranty service.

Since sales of properties in your area can directly affect the equity in your home, knowing about new sales as they occur allows you to maximize that equity.

Please think of this "notice" as a sort of "house statement" reflecting your home's current value...similar to those statements you receive from your bank.

Please don't hesiate to give me a call at 1-800-222-1234 or on my cell phone at 1-319-456-7869 if you'd like to chat.

Your Property Details

Estimated Property Value:   $756,000

Property indicator (type):   Single Family House

Living square footage:   2,450

Most Recent Local Sales

| Date of Sale | Amount | Property Address |
|---|---|---|
| 05/25/05 | $690,000 | 1234 Bodie Ave Simi Valley CA 98009-9876 |
| 06/12/05 | $795,999 | 3444 Rudy Ave Simi Valley CA 98009-9876 |
| 06/19/05 | $668,000 | 24544 Baldie Str Simi Valley CA 98009-9876 |
| 06/22/05 | $610,500 | 4565 Amigo Ave Simi Valley CA 98009-9876 |

METHOD FOR MONITORING AND REPORTING CHANGES IN THE VALUE OF REAL ESTATE

FIELD OF INVENTION

This invention relates, generally, to a process for monitoring and reporting real estate valuation; more particularly to a process in which interested individuals can be automatically notified of recent property sales and changes in values in particular neighborhoods.

BACKGROUND

Setting the optimum selling price for real estate property is crucial to a successful and profitable sale. An overpriced property can sit on the market for a year or more. An underpriced property may sell quickly, but for potentially far less money than it is actually worth. So before a property is sold, it is essential to know the property's true market value in today's ever-changing real estate market.

Traditionally, buyers or sellers of real estate contact real estate agents, brokers, or the like, to determine the value of real estate within a certain location. The problem with this method is that many individuals are reluctant to initiate contact with real estate agents or brokers for fear of having to commit to a sale or purchase, or fear of getting locked into an exclusive contract to pay a commission. Another problem is that the agent or broker, without being asked in advance, neither monitors nor notifies potentially interested parties about up-to-the minute changes in the property values within a certain given location. Even if agents were able to monitor changes in property values, the time and commitment required would be cost-prohibitive for the agents, particularly given that there is no assurance that such close monitoring would lead to closing any particular transaction for which that broker or agent would be certain to earn a commission. Sellers of real estate have another problem in that they have to pay to have the value of their real estate assessed and later pay again if the market changed before the sale has been closed.

Therefore, there has been a long felt need in the art for a method to allow people to monitor their property values, a process which is automated, accurate, and able to notify the interested individual on a regular basis at low cost and without the necessity of a personal relationship with an agent or a broker.

SUMMARY OF INVENTION

This invention is directed towards overcoming the above shortcomings by disclosing a method of monitoring real estate values that is automated and able to report directly to interested individuals.

In one embodiment, the method to monitor real estate values comprises evaluating an initial property valuation of the property of interest; monitoring periodically for the most recent local sales; determining an estimated property value of the property of interest; and notifying clients of the estimated property value and most recent local sales, and how the most recent local sales affect the estimated property value of the property of interest.

In another embodiment, the evaluating part comprises using at least one algorithm and at least one data set within a monitoring service computer.

In a further embodiment, the evaluating part comprises using information from a third party.

In one advantageous embodiment of the invention, the monitoring part comprises using at least one data set and at least one algorithm within the monitoring service computer. Alternatively, the monitoring part involves an individual randomly contacting the monitoring service computer.

A method to monitor real estate is disclosed wherein the determining part comprises a method of calculating the most recent local sale using latitude and longitude coordinates from data sets or from a real estate service, checking the most recent local sale's longitude and latitude coordinates against the property of interest's coordinates, and then determining whether the estimated property value for the most recent local sale is within a particular price range.

In one embodiment, the price range is a universal range. In a further embodiment, the price range is individually determined for each property monitored at the time of the initial property valuation.

In another embodiment, the method to monitor real estate involves recording the identities of the properties used as most recent local sale and the property of interest receiving the estimated property value in the monitoring service computer.

Further, a method to monitor real estate values is disclosed, where the notifying part comprises contacting individual consumers by electronic means. Alternatively, third parties could be contacted by electronic means.

In one embodiment of the invention, the method to monitor real estate values further comprises displaying a map of the neighborhood of the property of interest, the estimated property value, and the most recent local sales information. In another embodiment, the method comprises displaying an equity calculator. In a further embodiment, the method to monitor real estate values comprises displaying an equity history over time of the property of interest.

Further, a system to monitor real estate values is disclosed which comprises a means for evaluating an initial property value of the property of interest; a means for checking periodically for the most recent local sales; a means for determining the estimated property value of the property of interest based upon the most recent local sales; and a means for notifying clients of the most recent local sale, and how the most recent local sales affect the estimated property value of the property of interest.

BRIEF DESCRIPTION OF THE DRAWINGS

FIG. 4 is an illustration of a computer screen form to be filled out by the end-user to request the monitoring service to monitor a property of interest.

FIG. 5 is an illustration of a report displayed on a computer screen used by the monitoring service to notify end-users of the EPV and MRLS data.

DETAILED DESCRIPTION OF THE DRAWINGS

Figure 1:
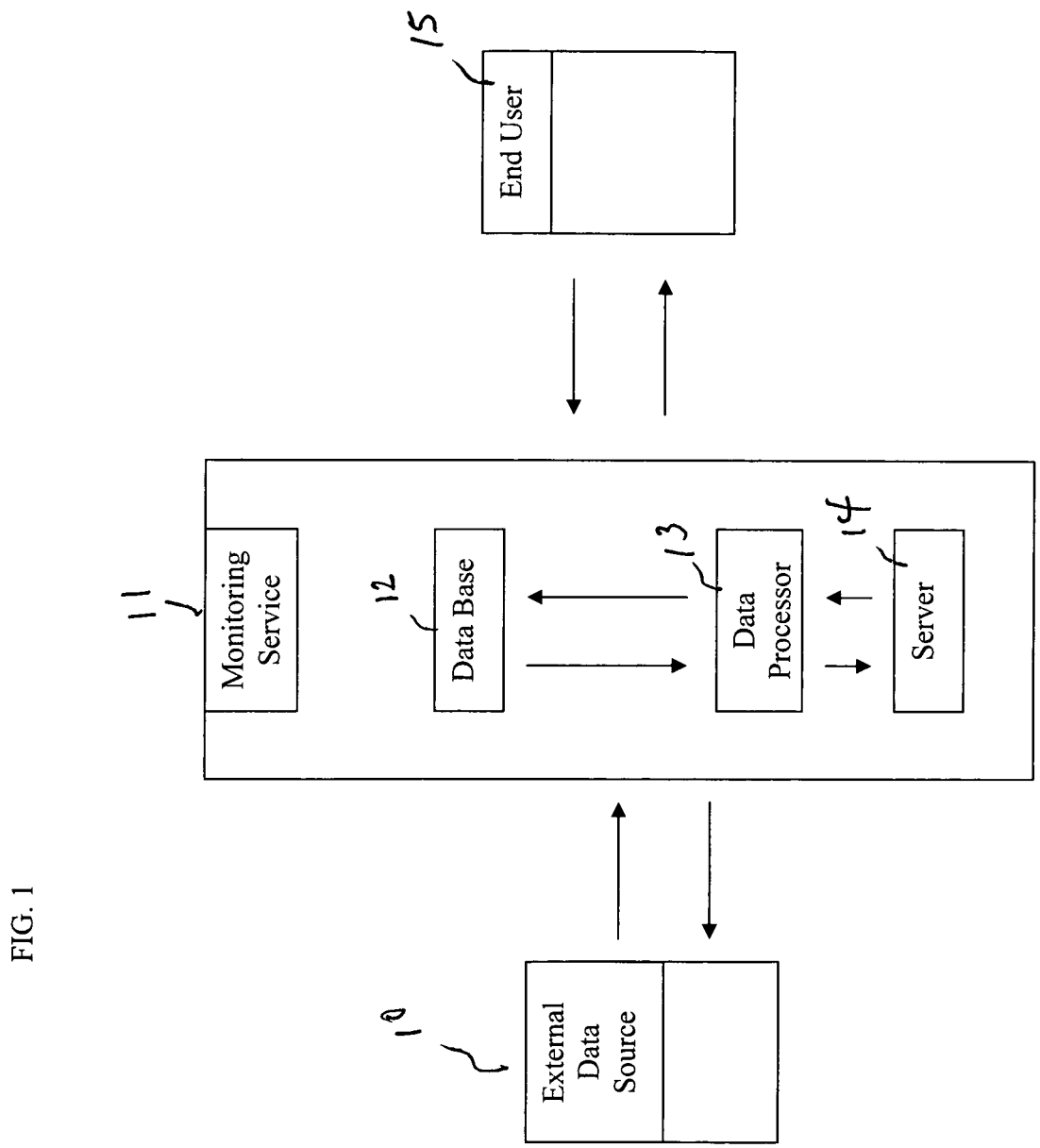
FIG. 1 is a block diagram illustrating the relationships between the parties.

FIG. 1 shows the external data source 10 in relationship with the monitoring service 11 which is in relationship with the end-user 15. The monitoring service comprises data base 12, data processor 13, and server 14 components.

Figure 2:
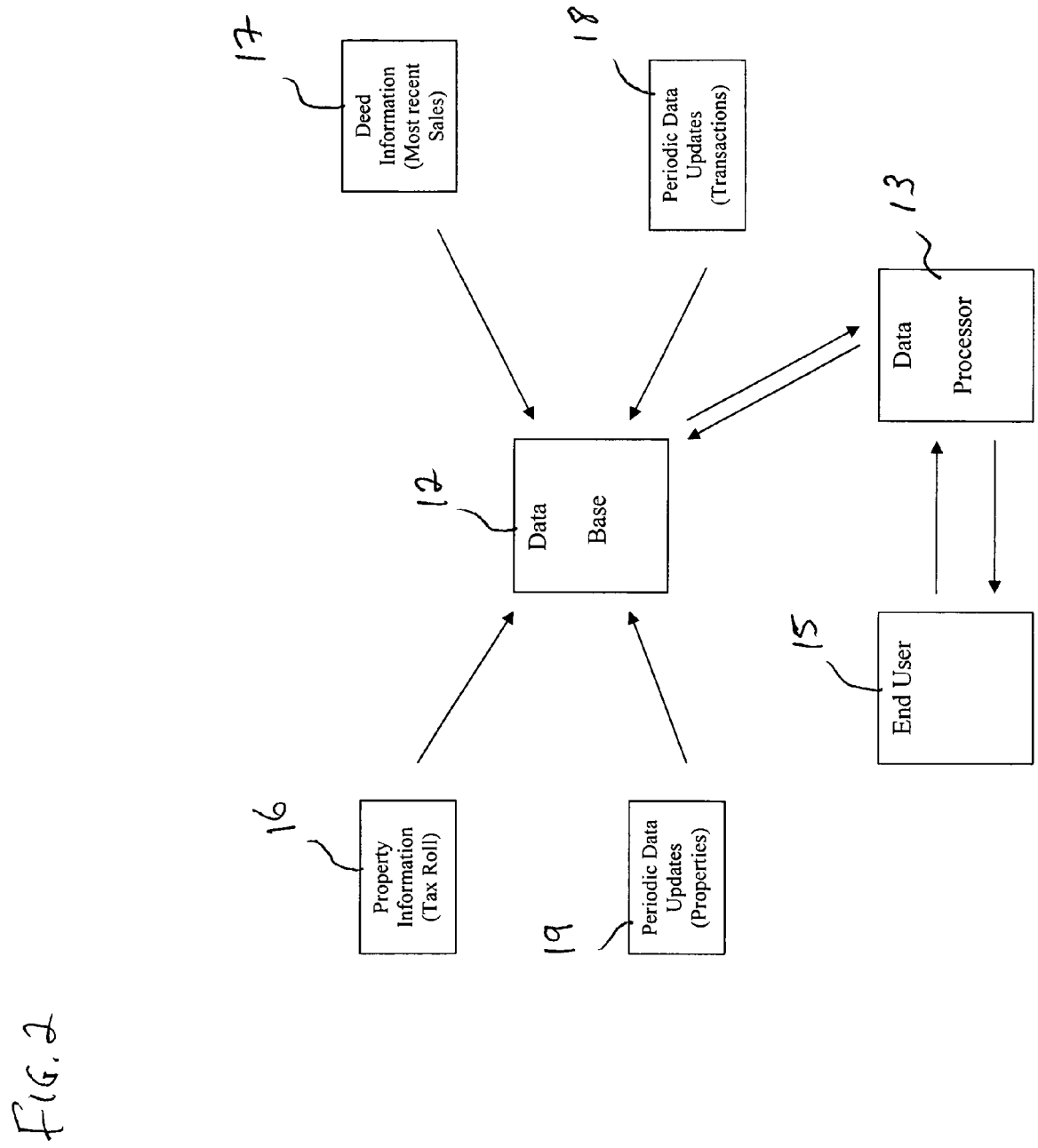
FIG. 2 is a block diagram illustrating the information sent from the External Data Source to the Data Base within the Monitoring Service.

FIG. 2 shows information flowing from one or numerous external data sources. This information or data sets includes, but is not limited to, real estate information from tax rolls 16, deed information (most recent sales) 17, periodic data updates (transactions) 18, periodic data updates (properties) 19, and other public records and real estate information. The external data source(s) 10 will send information to the monitoring service 11 using ASCII file, FTP or similar electronic link, or with human intervention using a CD or DVD-ROM or other portable data storage means. The data will be sent periodically in an automatic manner as determined by algorithms, or when desired as determined by human operators using a computer, a web browser, and a graphical user interface (GUI) operably connected to the external data source's server or computer.

The monitoring service 11 consists of data base 12, data processor 13, and server 14. The data base 12 is comprised of information obtained from the external data sources that consist of data sets such as property information from tax rolls 16, deed information (most recent sales) 17, periodic data updates (transactions) 18, periodic data updates (properties) 19, and other public records and real estate information. The data base 12 will also record information computed by algorithms within the data processor such as, but not limited to, most recent listed sales (MRLS) 20 and estimated property value (EPV) 21.

The data processor 13 within the monitoring service 11 consists of several different algorithms whose function includes, but is not limited to, (i) monitoring properties of interest (ii) calculating the most recent listed sales (MRLS) 20, (iii) calculating the estimated property value (EPV) 21 and (iv) calculating changes in property values.

The data processor 13 monitors properties using algorithms. For instance, the following algorithms can be used to monitor interested properties:

If X count of props can be found within Y radius then send notification to the end user.

If the property type is A, B, or C and within a certain geographic area send notification to the end user.

Other than using algorithms, notification can be initiated via human operator intervention using a computer, web browser, and a graphical user interface (GUI) operably connected to the monitoring service's server or computer.

The data processor 13 determines the initial property valuation (IPV) with algorithms using data sets within the data base 12 including, but not limited to, real property information from tax rolls 16, deed information (most recent sales) 17, periodic data updates (transactions) 18, periodic data updates (properties) 19, and other public records and real estate services.

The processor also performs calculations of MRLS using latitude and longitude coordinates from data sets within the data base or from real estate services, checks each MRLS property's longitude and latitude coordinates against the coordinates of the property of interest, and then determine whether the estimated property value of the MRLS is within a particular range. The price range can be either a universal range or one that is individually determined for each property monitored at the time of the initial valuation. The identities of the properties used as recognized MRLS are recorded in the database 12.

Calculation of the EPV or its updated valuation is based on algorithms within the data processor 13 using data sets within the database 12 that includes, but is not limited to, real property information from tax rolls 16, deed Information (most recent sales) 17, periodic data updates (transactions) 18, periodic data updates (properties) 19, and all MRLS data for a monitored property after so many number of MRLS have been discovered. The identities of the properties receiving the EPV are recorded in the database 12.

The server 14 links the monitoring service to the internet. The monitoring service receives and transmits information respectively to the external data source 10 and the enduser 15.

Figure 3:
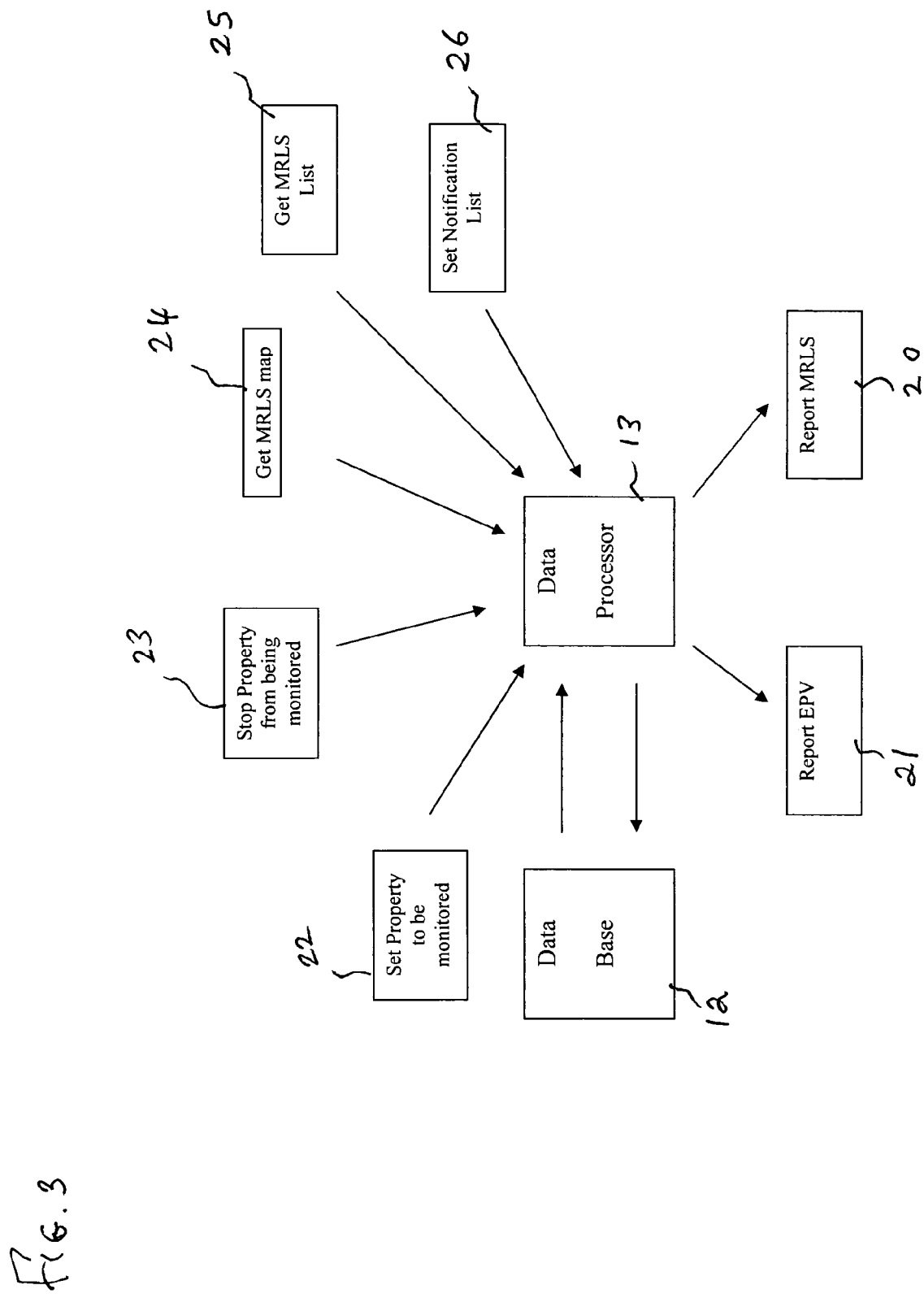
FIG. 3 is a block diagram illustrating commands being sent into the Data Processor within the Monitoring Service and the reports generated by the Monitoring Service.

FIG. 3 illustrates that the end-user entities 15 can request from the monitoring service 11 functions such as, but not limited to, which properties are to be monitored 22, which properties to stop monitoring 23, MRLS maps 24, MRLS listings 25, and listings 26 of individuals or parties that should be notified of EPV 21 and MRLS 20 data.

FIG. 4 is an illustration of a computer screen form to be filled out by the end-user 15 to request the monitoring service 11 to monitor a property of interest.

FIG. 5 illustrates a report displayed on a computer screen used by the monitoring service to notify end-users 15 of the EPV 21 and MRLS 20 data.

The end-user entity 15 can be directly notified by the monitoring service 11 using electronic means, or the end-user can initiate contact with the monitoring entity via electronic means. Here, the notification can also be personalized as if it came from a third party. The end-user 15 can be either individual consumers, or third party entities who are interested in providing information to their clients. Data from this notification process including, but not limited to, a record of the need to make the notification, a record of the fact that the notification was actually made via a certain manner, and when necessary, a record that notification was made but sent back (and noting what the reason was) will all be recorded in the database 12 of the monitoring service's computer for further use.

The end-user entity 15 is comprised of a computer, a web enabled browser, and a graphical user interface (GUI) operably connected to said end user's server or computer.

I claim:

1. A method to monitor real estate values comprising:
receiving an indication of a property of interest;
monitoring a local real estate market periodically near the property of interest for a recent completed local sale via an electronic monitoring service comprising a processor, a database and a server;
determining how the recent completed local sale affects the real estate value of the property of interest via the electronic monitoring service; and
notifying clients of the monitoring service electronically of said recent completed local sale.

2. The method to monitor real estate values of claim 1, wherein said monitoring comprises determining real estate properties within a predetermined radius of the property of interest and determining whether any of the real estate properties has been sold within a predetermined period of time.

3. The method of claim 2, wherein determining real estate properties within a predetermined radius of the property of interest and determining whether any of the real estate properties has been sold within a predetermined period of time are performed manually using a monitoring service computer.

4. The method to monitor real estate values of claim 1, wherein identities of a property used as the recent completed local sale and the property of interest are recorded in a monitoring service computer.

5. The method to monitor real estate values of claim 1, wherein said notifying comprises contacting individual consumers with electronic means.

6. The method to monitor real estate values of claim 1, wherein said notifying comprises contacting third parties with electronic means.

7. The method to monitor real estate values of claim 1, wherein notifying clients of said recent completed local sale comprises:
displaying a map of the neighborhood of the property of interest, an estimated property value of the property of interest, and the recent completed local sale information near the property of interest.

8. The method to monitor real estate values of claim 1, wherein notifying clients of said recent completed local sale comprises:
the step of displaying an equity history over time of the property of interest.

9. The method to monitor real estate values of claim 1 wherein determining whether the recent completed local sale affects the real estate value of the property of interest comprises:
evaluating an initial property valuation of the property of interest using data sets within a database of the electronic monitoring service, the data sets including one or more of real property information of the property of interest from tax rolls, deed information, and periodic data updates; and
determining an estimated property value of the property of interest.

10. A tangible computer-readable storage medium having instructions stored thereon, the instructions configured for execution by a computing system in order to cause the computing system to:
receive an indication of a property of interest;
monitor a local real estate market periodically near a property of interest for a recent completed local sale;
determine how the recent completed local sale affects the real estate value of the property of interest; and notify clients of said recent completed local sale.

11. The tangible computer-readable storage medium of claim 10, wherein determine whether the recent completed local sale affects the real estate value of the property of interest comprises:
evaluate an initial property valuation of the property of interest using data sets within a database, the data sets including one or more of real property information of the property of interest from tax rolls, deed information, and periodic data updates; and
determine an estimated property value of the property of interest.

12. The tangible computer-readable storage medium of claim 11, wherein said evaluate an initial property valuation of the property of interest using data sets within a database comprises using information obtained from a third party.

13. The tangible computer-readable storage medium of claim 10, wherein said monitor the local real estate market periodically near a property of interest for a recent completed local sale comprises determine real estate properties within a predetermined radius of the property of interest and determine whether any of the real estate properties has been sold within a predetermined period of time.

14. A real estate monitoring system, comprising:
a computing system comprising one or more hardware processors configured to execute a plurality of software modules, the software modules including at least:
a real estate monitoring module configured to monitor a local real estate market periodically near a property of interest for a recent completed local sale;
a valuation module configured to determine how the recent completed local sale affects the real estate value of the property of interest; and
a notification module configured to notify clients of the monitoring system of said recent completed local sale.

15. The real estate monitoring system of claim 14, wherein the valuation module is further configured to:
evaluate an initial property valuation of the property of interest using data sets within a database, the data sets including one or more of real property information of the property of interest from tax rolls, deed information, and periodic data updates; and
determine an estimated property value of the property of interest.

16. The real estate monitoring system of claim 14, wherein the real estate monitoring module is further configured to determine real estate properties within a predetermined radius of the property of interest and determine whether any of the real estate properties has been sold within a predetermined period of time.

17. The method to monitor real estate values of claim 9, wherein said evaluating comprises using information obtained from a third party.

18. The method to monitor real estate values of claim 9, wherein said determining the estimated property value of the property of interest comprises:
determining whether an estimated property value for said recent completed local sale is within a predetermined price range.

19. The method to monitor real estate values of claim 18, wherein said predetermined price range is the same for any property of interest being monitored.

20. The method to monitor real estate values of claim 18, wherein said predetermined price range is individually determined for each property of interest monitored at the time of the initial property valuation.

* * * * *